March 27, 1951  L. F. COLLINS  2,546,388
MICROMETER CALIPER
Filed June 23, 1947
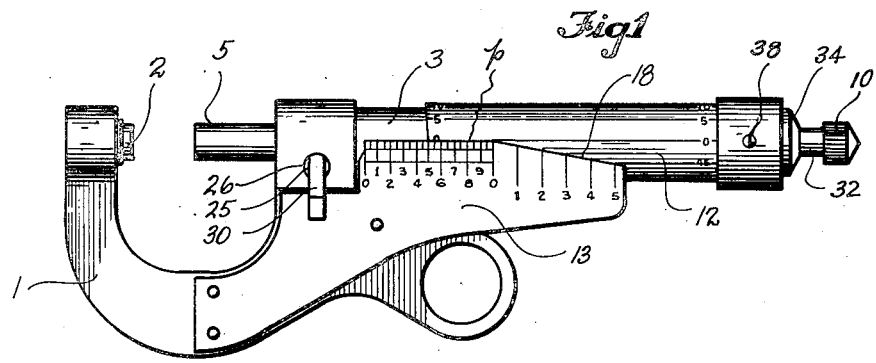
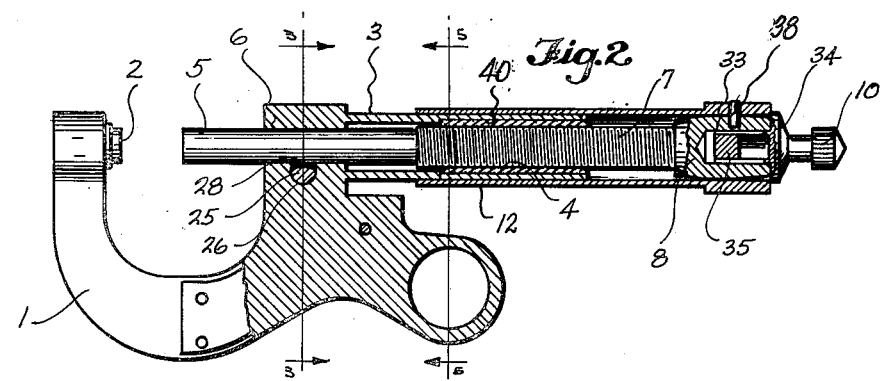
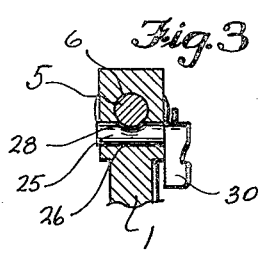
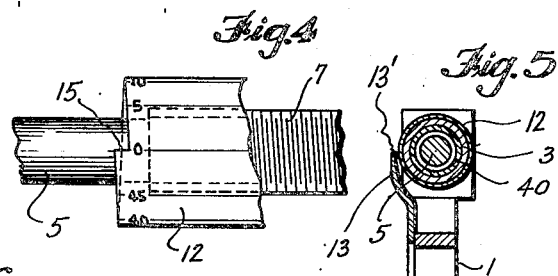
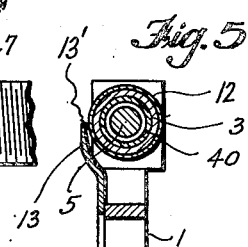
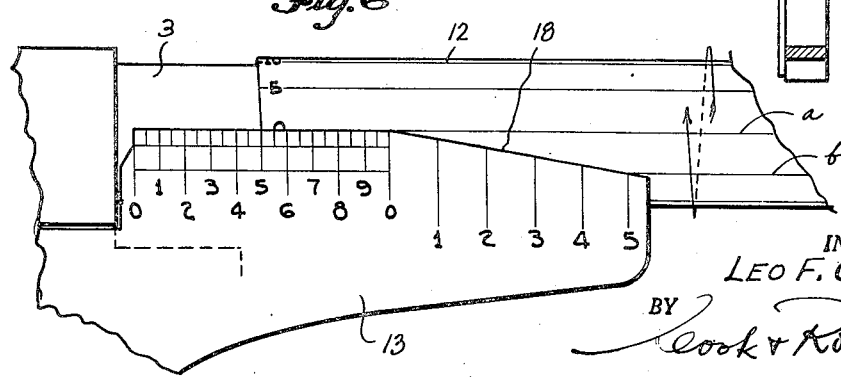
INVENTOR.
LEO F. COLLINS
BY
Cook & Robinson
ATTORNEYS Patented Mar. 27, 1951

2,546,388

UNITED STATES PATENT OFFICE 2,546,388

MICROMETER CALIPER

Leo F. Collins, Seattle, Wash.

Application June 23, 1947, Serial No. 756,361

1 Claim. (Cl. 33—166)

This invention relates to micrometer calipers and it has reference more particularly to improvements in the relationship and calibration of the measurement indicating scales of such devices; in means for locking the spindle to temporarily retain a reading or measurement and in a speeder attachment for the spindle.

It will here be explained, as matter pertinent to a better understanding of the present invention, that a precise reading of an instrument of the present character for measuring the thickness or external diameter of an object or the distance between points may be obtained by observing the point of intersection of divergent or convergent lines of different scales. Furthermore, readings can be made with greater ease, more quickly and with less chance of error if all scales and pertinent graduations are visible at a single glance without the necessity of turning the instrument over in the hand or observing one or more scales or verniers at a different angle of vision.

Attention also is directed to other important features in the development of micrometer calipers—first, the providing of means whereby the spindle may be locked in position without changing its setting in the slightest degree and second, a friction device referred to as a "speeder" and used to transmit torque from the operator's fingers to the thimble, so that the micrometer can be brought to the same reading regardless of the difference in the degree of sensitiveness of touch of different operators.

The principal objects of my invention relate to the above and are: to provide micrometer calipers with an improved relationship in certain of the measurement indicating scales or verniers as a means of making possible a greater accuracy in readings taken; to improve the means for securely locking the spindle after a measurement has been taken so as to avoid possible mistakes due to accidental movement of the spindle; to provide an improved friction turning knob, or speeder, for the spindle that will insure the same reading when taken by different persons, and to provide means making possible adjustments to bring scales to proper relationship.

Other objects of the invention reside in the details of construction of parts and in their combination and mode of operation, as will hereinafter be described.

In accomplishing these and other objects of the invention, I have provided the improved details of construction, the preferred forms of which are illustrated in the accompanying drawings, wherein—

Fig. 1 is a side view of a screw thread micrometer caliper, embodying improvements of the present invention therein and showing the various scales and their calibrations, and the external features of the spindle locking device.

Fig. 2 is a vertical section, taken longitudinally of the micrometer along the axial line of the spindle.

Fig. 3 is a cross section on line 3—3 in Fig. 2.

Fig. 4 is a detail, illustrating the spiral character of the reference edge on the thimble and line of offset at zero mark of graduations which extend along this reference edge of the thimble.

Fig. 5 is a cross section on line 5—5 in Fig. 2.

Fig. 6 is a detail showing scales and their calibration marks as enlarged from the showing in Fig. 1.

Referring more in detail to the drawings:

First describing the improved construction and application of the micrometer features as illustrated in Figs. 1 and 6, I designates the U-shaped, rigid frame portion of a conventional type of screw thread micrometer, and 2 designates the anvil which is permanently affixed to the inside and at the upper end of one of the legs of the frame. Extending outwardly from the other of the legs of the frame, formed integrally therewith and aligned with the anvil, is a cylindrical sleeve 3 that has a portion thereof, presently described more in detail, interiorly threaded as at 4. A spindle 5 is coaxially contained in the sleeve and has its inner end portion extended rotatably and slidably through a hole 6 in the frame, for the endwise adjustment of the spindle toward and from the anvil.

The outer end portion of the spindle is threaded, as at 7, to match the interiorly threaded portion of the sleeve in which it is contained, and this threaded portion of the spindle extends beyond the outer end of the sleeve and at its outer end has a diametrically enlarged head portion 8 in which the speeder attachment or turning knob 10 is fitted, as will presently be described in detail.

Telescopically applied over the sleeve 3 for adjustment therealong is the thimble 12 which, at its outer end, contains therein the enlarged outer end portion 8 of the spindle, and has a connection therewith, as presently described, whereby the thimble will be rotated and adjusted inwardly and outwardly along the sleeve as adjustments of the spindle are made.

As illustrated best in Figs. 1 and 6, the primary scale, or counter, is marked on the horizontal top edge portion of a plate 13 that is fixed rigidly to the base portion of the frame 1 and extends laterally thereof. The top edge portion of this plate that is graduated to form the primary scale is designated at 13' in Fig. 5 and is shown to lie close to the sleeve and parallel with the axis of the spindle. This primary scale as formed on plate 13, has twenty graduations extending over a distance of one inch. In this connection it is to be understood that the threads of the spindle 5 are twenty pitch, and thus with the turning of the thimble, in either direction, it will move along the primary scale to the extent of one of the spacings of the primary scale, or from one graduation to the other, for each rotation of the spindle and sleeve. The primary scale is designated at $p$ in Fig. 1.

The secondary scale, or counter, is formed about the inner end of the thimble as shown best in Fig. 4. This end edge, or reference edge of the thimble, is in spiral form, and of exactly the same pitch as the screw threads of the spindle. At the zero mark of this secondary scale, as noted best in Fig. 4, the reference edge has a horizontal offset, 15, equal in length to one graduation of the primary scale, that is, an offset of .05 inch. The reference edge is divided by ten equal graduations, extending about the end of the thimble and numbered by fives from 0 to 50. Thus, by revolving the thimble from 0 to 5, using the scale at the end edge of sleeve as a reference, would indicate a change in distance between the face of the anvil and end of the spindle of five-fiftieths of one-twentieth of an inch as read in connection with the primary scale. The readings on the primary and secondary scales as shown in Figs. 1 and 6, would be .500 inch on the primary scale and .000 inch on the secondary scale, or a total of .500 inch. This would be increased by .005 inch for each additional graduation on the secondary scale.

In addition to the primary and secondary scales above described, there is also a vernier scale to give fractional measurements between graduations of the thimble scale. This vernier scale is formed along a downwardly sloping top edge portion 18 of the plate 13 that continues from the right hand of the primary scale as seen in Fig. 6 and downwardly along the rounded surface of the thimble. This vernier scale has five equal graduations, marked from 0 to 5. When the thimble is so disposed that one of the longitudinal lines thereon, which continue from the graduations of the secondary scale, is exactly registered with the edge of the primary scale and also with the zero mark of the vernier scale, for example as does the line $a$ in Fig. 6, the 5 mark of the vernier scale will then exactly register with the next longitudinal line, $b$ of the vernier scale. Thus, each graduation on the vernier scale indicates one-fifth of five-fiftieths of one-twentieth of an inch, or .001 inch. The spaces between the vernier scale graduations can be further mentally interpolated to give fractional readings of .001 inch.

The spindle locking means is shown best in Figs. 1, 2 and 3, and it comprises a round shaft 25 that is rotatably fitted in a hole 26 that extends through the leg of the frame 1 that mounts the sleeve. The pin has a shallow recess 28 at one side, as seen in Fig. 3, for passage of the spindle. At its outer end, the shaft has a lever 30 fixed thereto whereby the shaft may be turned to cause it to have a clamping or wedging effect on the spindle that holds the latter against turning and thus prevents accidental loss of a reading or measurement. The base of the recess 28 of the shaft is curved laterally, as seen in Fig. 2, to produce a gradual increase of the wedging effect when the shaft is turned.

Another important feature of construction resides in the manner of mounting the speeder knob 10. This knob has a tubular mounting shank 32, split longitudinally at 90° intervals, and fitted in an axial bore 33 in the outer end of the spindle 5. A collar 34 on the shank limits the extent to which it may enter this bore, and inside the split inner end portion of the shank is a rubber plug 35 that exerts expanding force against the split shank to maintain a definite frictional pressure between the shank and spindle that will insure the same readings when taken by different persons, regardless of different degrees of sensitiveness of the individuals.

Yet another important feature of construction resides in the manner in which the thimble is affixed to the spindle head 8. It is shown in Fig. 2 that the outer end portion of the thimble is fitted rather loosely around the enlarged outer end portion of the spindle, and that a short stud or pin 38 is extended through a wall of the thimble and threaded or otherwise secured in the spindle. This provision of a semi-rigid connection provides easier operation of the device and freedom from binding.

Still another feature of this construction that is desirable from the standpoint of manufacture and also to provide for bringing the scales into proper adjustment, resides in connecting of the sleeve and spindle by means of an internally threaded bushing 40 that is fitted friction tight in the sleeve and receives the threads of the spindle. This bushing may be forced endwise or adjusted as may be required to bring the scaled parts into accurate adjustment.

Having thus described my invention, what I claim as new therein and desire to secure by Letters Patent, is:

A caliper of the character described comprising a frame having an anvil fixed therein and a spindle having a threaded mounting in the frame for adjustment toward and from the anvil; a thimble fixed to the spindle to rotate and to move endwise therewith, a scale plate fixed to the frame, with a straight edge that extends along the thimble, and a scale calibrated on said edge by graduations at spacings equal to the lead of the spindle thread, and said thimble having a helical line defined thereon that extends once around the thimble in a lead equal to that of the spindle thread and terminating at its ends in a zero line that is lengthwise of the thimble, and which helical line will register at its ends in exact coincidence with adjacent graduations on the scale when the zero line of the thimble is registered with said scale edge, and there being graduations on the thimble along the helical line starting at the zero line and setting off equal fractional parts of the circumferential distance about the thimble; said fixed scale plate having an angularly directed edge continuing from one end of the straight edge scale and of a length to span two adjacent longitudinal lines of the thimble, and there being graduations on the angularly directed edge setting off even fractional parts of the spaces between said longitudinal lines.

LEO F. COLLINS.

(References on following page)

REFERENCES CITED

The following references are of record in the file of this patent:

UNITED STATES PATENTS

| Number | Name | Date |
|---|---|---|
| 448,089 | Starrett | Mar. 10, 1891 |
| 756,461 | Borduas | Apr. 5, 1904 |
| 1,143,007 | Wilcox | June 15, 1915 |
| 1,267,075 | Hubbell | May 21, 1918 |
| 1,391,016 | Slider et al. | Sept. 20, 1921 |
| 1,440,824 | Fullmer | Jan. 2, 1923 |
| 1,446,926 | Parker | Feb. 27, 1923 |
| 1,654,843 | Sparks | Jan. 3, 1928 |

FOREIGN PATENTS

| Number | Country | Date |
|---|---|---|
| 3,958 | Great Britain | Sept. 30, 1880 |
| 126,259 | Great Britain | May 8, 1919 |

OTHER REFERENCES

Publ.: Brown and Sharpe Catalog No. 29, page 9, 1924.